July 24, 1962 J. I. RHODES 3,046,486
SIGNAL RECEIVING APPARATUS
Filed April 6, 1959

INVENTOR.
Junior I. Rhodes
BY George V. Eltgroth
ATTORNEY

United States Patent Office 3,046,486
Patented July 24, 1962

3,046,486

SIGNAL RECEIVING APPARATUS

Junior I. Rhodes, Lynchburg, Va., assignor to General Electric Company, a corporation of New York Filed Apr. 6, 1959, Ser. No. 804,477
11 Claims. (Cl. 329—138)

Figure 1:
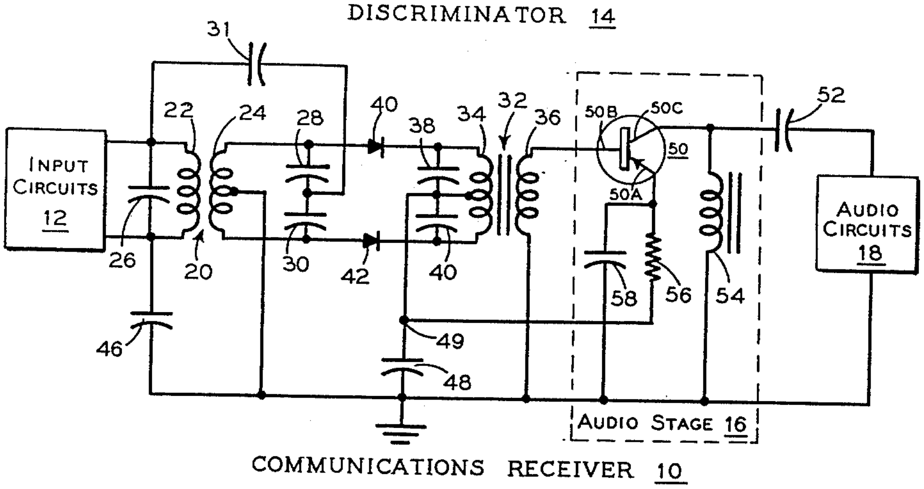

This invention relates to signal receiving apparatus and more particularly to means for utilizing the power normally wasted in the discriminators of apparatus for receiving angle-modulated signals.

Discriminators are modulation detectors or circuits which transmit from their output a signal varying in amplitude and polarity in accordance with the variation of the phase or frequency of the signals received by their inputs.

It is well known that discriminators are very inefficient circuits. In general, discriminators select energy only from those portions of the angle-modulated signals which contain the information for transmission to other stages in the signal receiving apparatus and dissipate the energy of the carrier signals and any noise energy. For example, a discriminator has zero percent efficiency when receiving an unmodulated carrier signal and only about four percent efficiency when receiving an angle-modulated signal.

Heretofore, since signal receivers ordinarily employed vacuum tubes that required operating potentials in the order of hundreds of volts and also required heater voltages, rectified alternating current power supplies were employed and the waste could easily be tolerated. However, particularly with the advent of transistors, battery power supplies have become particularly attractive since battery operated receivers can be portable.

In the personal communications field as well as other fields where miniaturization is desirable, the size and weight of the receiver is critical. Thus, the batteries must be as small as possible. If a given receiver wastes little electrical energy or power, the size of the batteries required to power the receiver can be minimized. Further, a battery of a given size can power a more efficient receiver for a longer time than a receiver which wastes power.

It is accordingly an object of the invention to provide improved signal receiving apparatus.

It is another object of the invention to provide portable signal receiving apparatus which more efficiently utilizes the limited amount of power available.

It is a more specific object of the invention to utilize the power normally wasted in the discriminator circuit of a portable receiver.

Briefly, in accordance with a preferred embodiment of the invention, signal receiving apparatus is provided comprising signal amplifying means requiring operating power, a source of signals that are angle modulated, a discriminator responsive to the source of signals to transmit signals that are amplitude modulated in accordance with the angle modulation, and means responsive to the discriminator for feeding the power normally wasted in the discriminator to the signal amplifying means to provide at least a portion of its required operating power.

It should be noted that the power fed from the discriminator may of itself supply the power required by the signal amplifying means or it may be used to supplement a conventional source of power.

Figure 2:
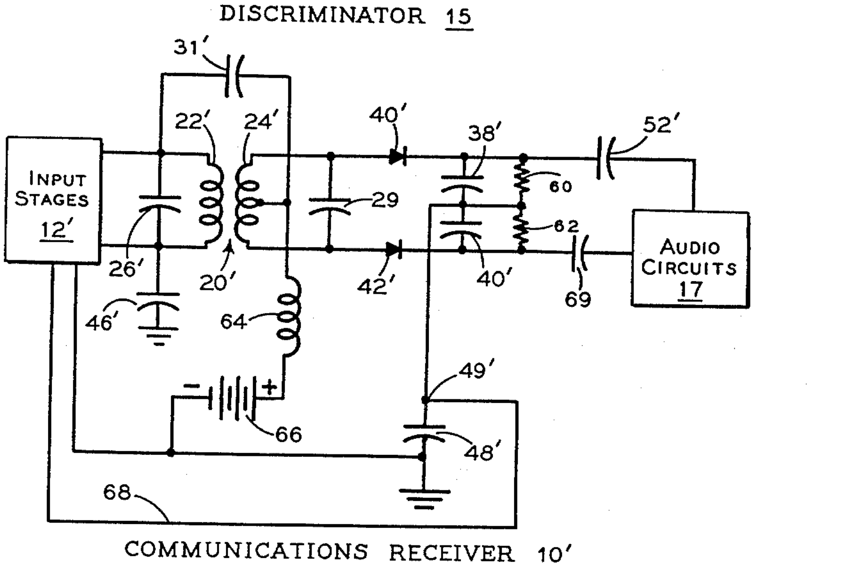

Other objects, features and advantages of the invention will be apparent from the following detailed description when read with the accompanying drawings wherein:

FIGURE 1 is a schematic diagram of signal receiving apparatus for conserving power in accordance with one embodiment of the invention; and FIGURE 2 is a schematic diagram of signal receiving apparatus for conserving power in accordance with another embodiment of the invention.

The generic term "angle modulated" is to be understood as being equally applicable to frequency modulated signals or phase modulated signals, or to hybrid modulations having characteristics common to frequency or phase modulation.

Referring to FIGURE 1, a communications receiver 10 is shown comprising head end or input circuits 12 which receive angle-modulated signals that are fed after amplification and limiting to a discriminator 14. Discriminator 14 converts the angle-modulated signals to audio frequency power that is fed to an audio stage 16 for further amplification before being fed to audio circuits 18 for conversion to audible intelligence.

The input circuits 12 in general comprise an antenna, radio frequency amplifiers, oscillator and mixer circuits, intermediate frequency amplifiers and limiters. The audio circuits 18 may include additional audio stages and a speaker or earphones.

The discriminator 14 includes an input transformer 20, which may be slug tuned, having a primary winding 22 coupled to the input circuits 12 and a secondary winding 24. The primary winding 22 is tuned to the carrier frequency of the angle-modulated signal by means of capacitor 26. The secondary winding 24 is also tuned to the carrier frequency by the serially disposed capacitors 28 and 30 connected across the outer arms of the secondary winding 24. Capacitors 28 and 30 are preferably of the same value. A capacitor 31 couples the signal side of the primary winding 22 to the junction of the capacitors 28 and 30.

An output transformer 32, having a primary winding 34 and a secondary winding 36, couples the discriminator 14 to the audio stage 16. Capacitors 38 and 40, preferably of equal value, are serially disposed across the primary winding 34. A unilateral conducting device or diode 40 couples one lead of the secondary winding 24 of input transformer 20 to a corresponding lead of the primary winding 34 of output transformer 32. The unilateral conducting device or diode 42 couples the other lead of the primary winding 24 of input transformer 20 to the other lead of the primary winding 34 of output transformer 32. It should be noted that the diodes 40 and 42 are polarized in the same direction, i.e., as shown in FIGURE 1, the anode of each of the diodes 40 and 42 is connected to a corresponding lead of the secondary winding 24.

Capacitors 46 and 48 are alternating current bypasses to ground. In particular, the capacitor 46, which is coupled to the operating potential side of the primary winding 22, prevents the feeding of intermediate frequency signals to other stages of the communications receiver 10 via the usual power supply circuits. The capacitor 48, which is hereinafter more fully described, is a filtering capacitor.

The discriminator 14 as described is a conventional balanced discriminator except that, in accordance with the invention, a means is provided between the midpoint or center tap of the secondary winding 24 of the input transformer 20 and the center tap of the primary winding 34 of output transformer 32 to furnish power to an external direct current load circuit. When angle-modulated signals are fed from the input circuits 12 to the discriminator 14, an alternating current signal is developed across the primary winding 34 of output transformer 32. This is an alternating current signal and the amplitude follows the angle modulation of the signal received from the input circuits 12. However, it should be noted that there is a very large direct current component which in conventional discriminators is wasted.

In a sense, the discriminator 14 may also be considered as a full-wave rectifier. For example, when the top lead of the secondary winding 24 is more positive than its center tap, current flows through the diode 40 and the primary winding 34, through the center tap of primary winding 34, through the external direct current load to the center tap of the secondary winding 24. Similarly, when the bottom lead of the secondary winding 24 is at a higher potential than the center tap of secondary winding 24, current flows through the diode 42 and the primary winding 34, through the center tap of primary winding 34, through the external direct current load circuit back to the center tap of the secondary winding 24. Thus, direct current power is developed by the discriminator 14 which is available to an external direct current load circuit. Since the resistance of the primary winding 34 is extremely low (i.e., the resistance is only the coil), most of the potential drop from the flow of the direct current is across the external direct current load circuit. Ordinarily, in conventional discriminators, any voltages developed because of the direct current component are wasted. However, in accordance with the invention, the direct current power developed by the discriminator 14 is used as a portion of the operating power required for other circuits in the communications receiver 10.

Accordingly, it should be noted that the center tap of the secondary winding 24 of the input transformer 20 is connected to ground potential, and the center tap of the primary winding 34 of output transformer 32 is coupled via the capacitor 48 to ground to provide filtering of the direct current power available to the external direct current load circuit. The terminal 49 of capacitor 48 may be considered as a source of direct current power.

Although this direct current power may be used at many points in the communications receiver 10, it is shown in FIGURE 1 as powering the audio stage 16.

The audio stage 16 comprises a transistor 50 of the p-n-p type operating as a common emitter amplifier. In particular, the base 50B of transistor 50 is connected to one lead of the secondary winding 36 of the output transformer 32 to receive the audio frequency power. The other lead of secondary winding 36 is returned to ground potential. The collector 50C of transistor 50 is coupled via capacitor 52 to the remaining output circuits 18 and via a filter choke 54 to ground potential. The emitter 50A of transistor 50 is coupled via a resistor 56 to its source of operating potential, the terminal 49 of capacitor 48. The capacitor 58 couples the emitter 50A to ground potential and acts as an alternating current bypass capacitor. Thus, the audio stage 16 is powered by the electrical energy ordinarily wasted in the discriminator 14.

It should be noted that the direct current power at terminal 49 is constant when the discriminator 14 receives angle-modulated signals from a noise saturated limiter stage.

FIGURE 2 shows a communications receiver 10′ which incorporates another embodiment of the invention. Since the communications receiver 10′ of FIGURE 2 is in many ways similar to the communications receiver 10 of FIGURE 1, primed reference characters will be employed for similar elements and only the differences in structure and function will be described in detail.

In particular, communications receiver 10′ comprises input stages 12′ which receive angle-modulated signals that are fed to discriminator 15 for conversion to varying amplitude signals that are fed to the audio circuits 17. The audio circuits 17 in general include any required audio amplifiers such as the audio stage 16 of FIGURE 1 and a speaker or earphone. In discriminator 15, the input transformer 20′ is identical to the input transformer 20 of discriminator 14 except that the capacitor 31′ couples the primary winding 22′ to the center tap of the secondary winding 24′ and a single capacitor 29 tunes the secondary winding 24′ to the carrier frequency. In addition, the output transformer 32 of FIGURE 1 is replaced by a pair of resistors 60 and 62, preferably of equal value, disposed serially between the cathodes of the diodes 40′ and 42′. The values of these resistors are chosen as small as possible to permit a minimum of direct voltage drop but, at the same time, allow the generation of an alternating current signal of usable power. It should also be noted that the value of the capacitor 38′ preferably equals the value of capacitor 40′.

The junction of the capacitors 38′ and 40′ is connected to the junction of the resistors 60 and 62 which may be considered the midpoint of the output circuit of the discriminator 15. This midpoint is coupled via an external direct current load circuit (input stages 12′), source of potential 66, and the radio frequency choke 64 to the center tap of the secondary winding 24′ of the input transformer 20′. Thus, as described in FIGURE 1, the direct current flow results in a direct current potential at terminal 49′. This direct current potential, which may be used in a similar manner as in FIGURE 1 to directly power other stages of the communications receiver 10′, is instead arranged in series with a source of potential 66 to provide a higher operating potential than that supplied by source of potential 66 by itself. In other words, the direct current power developed by the discriminator 15 is added to the direct current power provided by the source of operating potential 66. In particular, the terminal 49′ that is coupled to the midpoint of the output circuit of discriminator 15 is coupled via the filter capacitor 48′ to ground potential while the center tap of the secondary winding 24′ is connected to the positive terminal of the source of potential 66 whose other terminal is returned to ground potential.

Thus, the potential at the terminal 49′ is equal to the sum of the direct current voltage developed by the direct current flow in the discriminator 15 and the direct current voltage developed by the source of potential 66. Line 68 couples the terminal 49′ to the input stages 12′ to supply the stages with their required operating potentials.

It should be noted that when the communications receivers require potentials of opposite polarity it is only necessary to reverse the polarities of the diodes. For example, if the audio stage 16 of the communications receiver 10 of FIGURE 1 employs an n-p-n transistor, then it will be necessary to reverse the polarity of the diodes 40 and 42.

There has thus been shown improved signal receiving apparatus which is extremely useful in the signal transmission and reception art. This communications apparatus is highly efficient and ideally suited for personal communications receivers which utilize limited power supplies since it makes use of the power normally wasted in the discriminator circuits of such receivers. A typical improvement of the efficiency may be seen from the following example related to FIGURE 1. Let:

$P_{in}$=carrier power received by discriminator 14 from input circuits 12,
$P_{dco}$=direct current power available,
$P_{ao1}$=power transmitted from transformer 32 to audio stage 16,
$P_{ao2}$=power transmitted from audio stage 50.

Assume:

Efficiency of audio stage 50 is twenty-five percent, direct current output efficiency of discriminator 14 is eighty-six percent, and that the ratio of efficiency between the $P_{ao1}$ and $P_{in}$ is four percent.

Then:

$$\frac{P_{ao2}}{P_{in}}=\frac{.25P_{dco}}{P_{in}}=\frac{.25\times.86\times P_{in}}{P_{in}}=.215$$

and $$\frac{.215P_{in}}{.04P_{in}}=5.36 \text{ or } 7.3 \text{ decibels power gain}$$

This is the maximum power gained for the overall system by applying the normally wasted power to the discriminator 14 to the audio stage 16.

Typical values for the elements of FIGURE 1 are:

Capacitor 26=120 micro-microfarads
Capacitor 31=47 micro-microfarads

Capacitor 28=300 micro-microfarads
Capacitor 30=300 micro-microfarads
Capacitor 38=500 micro-microfarads
Capacitor 40=500 micro-microfarads
Capacitor 46=.001 microfarad
Capacitor 48=.001 microfarad
Capacitor 58=10 microfarads
Capacitor 52=5 microfarads
Diodes 40 and 42=1N198
Transistor 50=2N467 or equivalent
Filter choke 54=1 henry; 500 ohms resistance
Transformer 20=Tuned to chosen I.F. frequency
Transformer 32=50*k*:2*k* impedance ratio There will now be obvious to those skilled in the art many modifications and variations which accomplish the objects and from which accrue many or all of the advantages, but which do not depart from the spirit of the invention as defined in the appended claims.

What is claimed is:

1. In signal receiving apparatus which includes signal amplifying means requiring operating power, a source of signals that are angle modulated, a discriminator responsive to said source of angle-modulated signals to transmit signals that are amplitude modulated in accordance with the angle modulation, and means responsive to said discriminator for feeding the power normally wasted in said discriminator to said signal amplifying means to provide at least a portion of the required operating power for said signal amplifying means.

2. In signal receiving apparatus which includes a source of operating potential and signal amplifying means requiring operating power, a source of signals that are angle modulated, a discriminator responsive to said source of angle-modulated signals to transmit signals that are amplitude modulated in accordance with the angle modulation, and means responsive to said discriminator for adding the power normally wasted in said discriminator to the power from said source of operating potential to provide the required operating power for said signal amplifying means.

3. In signal receiving apparatus including signal amplifying means requiring operating power: a source of angle-modulated waves; a discriminator responsive to said source of angle modulated waves, said discriminator including a transformer means, first and second unilateral conducting means respectively coupled to said transformer means, an output means coupled between said first and second unilateral conducting means across which is developed an alternating current signal in response to the angle modulated waves received by said discriminator; and means coupling the midpoint of said transformer means and the midpoint of said output means to said signal amplifying means to provide at least a portion of the required operating power of said signal amplifying means.

4. In signal receiving apparatus which includes signal amplifying means requiring operating power: a source of signals that are angle modulated in accordance with an alternating current signal; a discriminator responsive to said source of signals, said discriminator including a pair of unilateral conducting means polarized in the same direction, tuned transformer means for coupling said source of signals to said pair of unilateral conducting means in an out of phase relationship, an output means having a resistive component which is substantially less than its reactive component coupling said unilateral conducting means together for developing an alternating current voltage related to the alternating current signal when said discriminator receives signals that are angle modulated from said source of signals; and means for coupling the midpoint of said tuned transformer means and the midpoint of said output means to said signal amplifying means for providing at least a portion of its required operating power from the otherwise wasted power of said discriminator.

5. In a receiver which includes a signal amplifying means requiring operating power, a source of signals that are angle modulated in accordance with an alternating current signal, a discriminator responsive to said source of signals, said discriminator including a transformer having a primary winding and a tuned secondary winding, said primary winding being coupled to said source of signals, an output means having a resistive component of impedance which is small relative to the total impedance of said output means, a pair of unilateral conducting devices respectively coupling one end of said tuned secondary winding to one end of said output means, said unilateral conducting devices being polarized in the same direction, and means for coupling the midpoint of said output means and the midpoint of said tuned secondary winding to said signal amplifying means so that an alternating current voltage is developed across said output means which is amplitude modulated in accordance with the alternating current signal and a direct current voltage is developed across said signal amplifying means to provide at least a portion of its required operating power.

6. The receiver of claim 5 including a source of potential for said signal amplifying means and means for serially adding the voltage developed by said source of potential to the direct current voltage developed by said discriminator.

7. In a receiver which includes head end circuits for amplifying and limiting angle-modulated signals in accordance with an alternating current signal; a discriminator responsive to said head end circuits for transmitting an amplitude modulated signal in accordance with the alternating current signal, said discriminator including a transformer having a primary winding and a tuned secondary winding, said primary winding being coupled to said head end circuits, a capacitance coupling said head end circuits to the midpoint of said tuned secondary winding, an output means having a resistive component of impedance which is small with respect to its reactive component, a pair of unilateral conducting devices respectively coupling one end of said tuned secondary winding to one end of said output means, said unilateral conducting devices being polarized in the same direction, and means coupling the midpoint of said output means and the midpoint of said tuned secondary winding to said head end circuits so that an alternating current voltage is developed across said output means and a direct current voltage is developed across said head end circuits to provide at least a portion of the required operating power.

8. The receiver of claim 7 including a source of potential for said head end circuits and means for adding the direct current power of said discriminator to the power developed by said source of potential.

9. A signal receiver comprising input circuits for receiving signals that are angle modulated, a discriminator responsive to said input circuits for converting the signals from said input circuits to amplitude-modulated signals, output circuits responsive to said discriminator, and means responsive to said discriminator for providing at least a portion of the operating power required by one of said circuits with the rectified direct current power usually wasted by said discriminator.

10. A signal receiver comprising input circuits for receiving signals that are angle modulated, a discriminator responsive to said input circuit for converting the signals from said input circuits to varying amplitude signals, output circuits responsive to said discriminator, a source of operating power for said signal receiver, and means responsive to said discriminator for adding the rectified direct current power usually wasted in said discriminator to the power from said source of operating power.

11. A signal receiver comprising input circuits for receiving signals that are angle modulated, a discriminator responsive to said input circuits for converting the signals from said input circuits to varying amplitude signals, output circuits responsive to said discriminator, a source of rectified direct current operating power usually wasted in said discriminator, said power to be used to power circuits in said signal receiver upon which the rectified direct current power source is not dependent.

References Cited in the file of this patent

UNITED STATES PATENTS

| | | |
|---|---|---|
| 2,501,120 | Carlson | Mar. 21, 1950 |
| 2,501,122 | Corrington | Mar. 21, 1950 |
| 2,540,532 | Koch | Feb. 6, 1951 |
| 2,777,057 | Pankove | Jan. 8, 1957 |
| 2,813,242 | Crump | Nov. 12, 1957 |
| 2,918,573 | Hollman | Dec. 22, 1959 |

OTHER REFERENCES

Article: "Designing Free-Power Transistorized AM and FM Receivers," by Hollmann, Electronic Industries and Tele Tech, September 1956, pages 54 to 56 and 92 to 95.